US012617396B2

(12) United States Patent
Horiguchi

(10) Patent No.: US 12,617,396 B2
(45) Date of Patent: May 5, 2026

(54) DRIVING CONTROL APPARATUS FOR VEHICLE

(71) Applicant: SUBARU CORPORATION, Tokyo (JP)

(72) Inventor: Harunobu Horiguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 8 days.

(21) Appl. No.: 18/772,541

(22) Filed: Jul. 15, 2024

(65) Prior Publication Data

US 2025/0074402 A1      Mar. 6, 2025

(30) Foreign Application Priority Data

Sep. 6, 2023    (JP) ................................. 2023-144517

(51) Int. Cl.
  *B60W 30/09*        (2012.01)
  *B60W 10/04*        (2006.01)
      (Continued)

(52) U.S. Cl.
  CPC ............ *B60W 30/09* (2013.01); *B60W 10/04* (2013.01); *B60W 10/18* (2013.01);
      (Continued)

(58) Field of Classification Search
  CPC ...... G06V 20/56; B60W 10/04; B60W 10/18; B60W 10/184; B60W 2552/05;
      (Continued)

(56) References Cited

U.S. PATENT DOCUMENTS

2011/0035126 A1*  2/2011  Ishikawa ............. B60W 40/064
                                                     701/65
2012/0173090 A1*  7/2012  Corcoran ............. G06Q 10/063
                                                     701/1
(Continued)

FOREIGN PATENT DOCUMENTS

CN        109664886 A  *  4/2019  ......... B60W 60/001
CN        110481556 A  *  11/2019 ......... B60W 40/068
      (Continued)

*Primary Examiner* — Babar Sarwar
(74) *Attorney, Agent, or Firm* — TROUTMAN PEPPER LOCKE LLP

(57)              ABSTRACT

A driving control apparatus for a vehicle includes a surrounding environment recognition device, a brake control device, a drive force control device, and a control unit. The surrounding environment recognition device obtains surrounding environment information of the vehicle. The brake control device performs brake control for the vehicle. The drive force control device performs drive control of front wheels and rear wheels individually. The control unit at least includes a rough road area entry determiner which executes a determination of entry of the vehicle into a rough road area and a road surface μ estimator which estimates a friction coefficient of a wheel contact surface. The control unit executes first avoidance control and then second avoidance control when the vehicle is found to enter an area where it is likely to be stuck in the rough road area based on a determination result of the rough road area entry determiner.

10 Claims, 5 Drawing Sheets

(51) Int. Cl.
  *B60W 10/18* (2012.01)
  *B60W 40/068* (2012.01)
  *G06V 20/56* (2022.01)

(52) U.S. Cl.
  CPC ........... *B60W 40/068* (2013.01); *G06V 20/56*
      (2022.01); *B60W 2552/05* (2020.02); *B60W*
      *2552/35* (2020.02)

(58) Field of Classification Search
  CPC ......... B60W 2552/35; B60W 2552/40; B60W
      30/09; B60W 30/18172; B60W 40/068;
      B60W 50/14
  See application file for complete search history.

(56) References Cited

U.S. PATENT DOCUMENTS

2017/0197630 A1 * 7/2017 Mohamed ............. B60W 40/06

| | | | | |
|---|---|---|---|---|
| 2018/0057003 | A1 * | 3/2018 | Hyun ................ | B60W 60/0016 |
| 2020/0263787 | A1 * | 8/2020 | Abe ................ | B60W 30/18027 |
| 2023/0191918 | A1 * | 6/2023 | Usui ................... | B60W 30/146 |
| | | | | 701/22 |

FOREIGN PATENT DOCUMENTS

| | | | | | |
|---|---|---|---|---|---|
| CN | 110576701 | A | * | 12/2019 | ........... B60B 15/263 |
| CN | 118665526 | A | * | 9/2024 | ........... B60W 50/14 |
| DE | 102024133199 | A1 | * | 5/2025 | ........... B60W 50/14 |
| GB | 2571589 | A | * | 9/2019 | ........... B60W 40/076 |
| JP | 2007038918 | A | * | 2/2007 | |
| JP | 3920547 | B2 | * | 5/2007 | |
| JP | 2009-78592 | A | | 4/2009 | |
| JP | 2009078592 | A | * | 4/2009 | |
| JP | 2009100566 | A | * | 5/2009 | |
| JP | 2019202645 | A | * | 11/2019 | |
| KR | 20240099727 | A | * | 7/2024 | ........... G08B 21/185 |
| WO | WO-2019166142 | A1 | * | 9/2019 | ............. G06V 20/56 |

* cited by examiner

DRIVING CONTROL APPARATUS FOR VEHICLE

CROSS-REFERENCE TO RELATED APPLICATION

The present application claims priority from Japanese Patent Application No. 2023-144517 filed on Sep. 6, 2023, the entire contents of which are hereby incorporated by reference.

BACKGROUND

The disclosure relates to a driving control apparatus for a vehicle, such as an automobile, which can perform driving control to allow the vehicle to avoid being caught in water or being stuck when driving in a rough road area, for example.

Hitherto, as vehicles such as automobiles, for example, as regular four-wheel automobiles, vehicles using an all-wheel drive system for driving all the wheels (usually four) including the front wheels and the rear wheels have been put into practical use and are widespread.

Typically, this type of vehicle using the all-wheel drive system has a high rough road running performance and is thus expected to be widely used in various driving environments. For example, when a vehicle drives in an unpaved road, which is regarded as a rough road, or a land which is not subjected to land leveling (hereinafter called an unleveled land), it may enter an area with a puddle, mud, or snow, for example. In this case, the vehicle may be caught in water and become unable to drive, or the driving wheels may spin out, that is, the vehicle may be stuck.

In this environment, when the vehicle is likely to be stuck, such as when the front wheels are caught in mud, if the vehicle is the one using the all-wheel drive system, it may get out of the mud by using a drive force applied to the rear wheels. In this case, however, if a drive force is excessively applied to the front wheels, the front wheels may spin out and the vehicle may be caught into an even deeper level.

To address this issue, various technologies have been proposed. For example, Japanese Unexamined Patent Application Publication (JP-A) No. 2009-78592 discloses a driving control apparatus for a vehicle using the all-wheel drive system, which can perform drive control to allow the vehicle to get out of such a stuck state by switching a drive force at a suitable timing.

SUMMARY

An aspect of the disclosure provides a driving control apparatus for a vehicle. The driving control apparatus includes a surrounding environment recognition device, a brake control device, a drive force control device, and a control unit. The surrounding environment recognition device is configured to obtain surrounding environment information of the vehicle. The brake control device is configured to perform brake control for the vehicle. The drive force control device is configured to perform drive control of front wheels and rear wheels individually. The control unit at least includes a rough road area entry determiner and a road surface μ estimator. The rough road area entry determiner is configured to execute a determination of entry of the vehicle into a rough road area. The road surface μ estimator is configured to estimate a friction coefficient of a wheel contact surface of the vehicle. The control unit is configured to execute first avoidance control and then to execute second avoidance control when the control unit has determined, based on a result of the determination of the rough road area entry determiner, that the vehicle is to enter an area where the vehicle is likely to be stuck in the rough road area.

An aspect of the disclosure provides a driving control apparatus for a vehicle. The driving control apparatus includes circuitry. The circuitry is configured to obtain surrounding environment information of the vehicle. The circuitry is configured to perform brake control for the vehicle. The circuitry is configured to perform drive control of front wheels and rear wheels individually. The circuitry is configured to execute a determination of entry of the vehicle into a rough road area. The circuitry is configured to estimate a friction coefficient of a wheel contact surface of the vehicle. The circuitry is configured to execute first avoidance control and then to execute second avoidance control when it is determined that the vehicle is to enter an area where the vehicle is likely to be stuck in the rough road area, based on a result of the determination regarding the entry of the vehicle into a rough road area.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

A vehicle may not be able to get out of a stuck state merely by a control operation performed by known driving control apparatuses, such as that disclosed in JP-A No. 2009-78592.

If a vehicle has to drive in a rough road area, it is desirable that the vehicle drive in the rough road area by avoiding entering an area with a puddle, mud, or snow, for example.

It is thus desirable to provide a driving control apparatus for a vehicle, such as an automobile, which can perform driving control to allow the vehicle to avoid being caught in water or being stuck when driving in a rough road area, for example.

Figure 1:
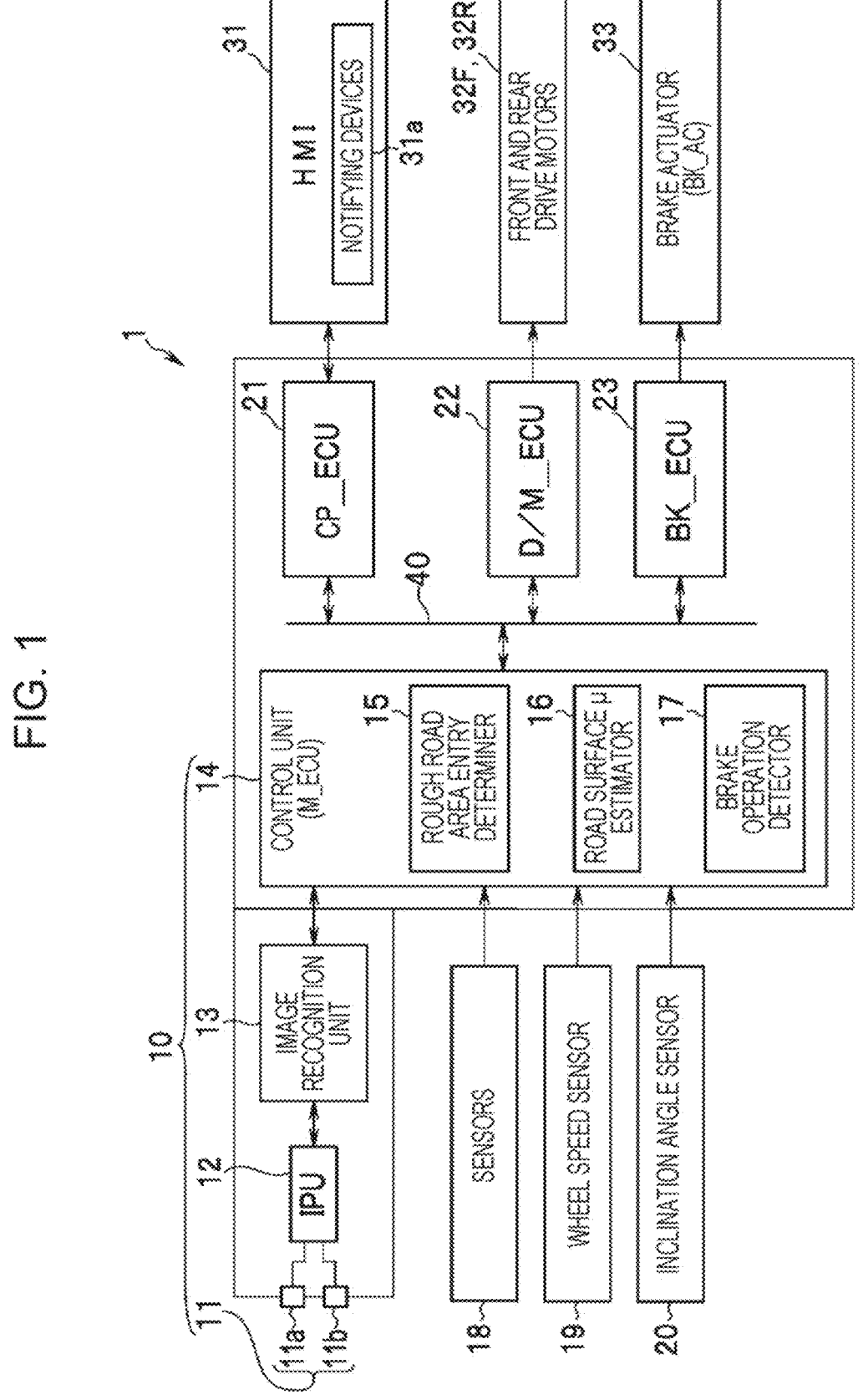
FIG. 1 is a block diagram illustrating the schematic configuration of a driving control apparatus for a vehicle according to an embodiment of the disclosure.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. The schematic configuration of a driving control apparatus for a vehicle will be described below with reference to FIG. 1. FIG. 1 is a block diagram illustrating the schematic configuration of a driving control apparatus 1 for a vehicle according to an embodiment of the disclosure.

The basic configuration of the driving control apparatus 1 illustrated in FIG. 1 is similar to that of the same type of known driving control apparatus for a vehicle. In the following description and illustration in FIG. 1, a detailed explanation and illustration of typical components of the same type of known driving control apparatus is omitted. Only major components related to the disclosure are illustrated in FIG. 1 and will be explained below.

The driving control apparatus 1 of the embodiment includes a camera unit 10, which is an in-vehicle camera device. The camera unit 10 includes a stereo camera 11 fixed to the top center of the front side of the compartment of a vehicle (not illustrated) which loads the driving control apparatus 1.

As illustrated in FIG. 1, the camera unit 10 includes components, such as a stereo camera 11, an image processing unit (represented as "IPU" in FIG. 1) 12, an image recognition unit 13, and a control unit (represented as "M_ECU" in FIG. 1) 14.

The stereo camera 11 includes two cameras, that is, a main camera 11a and a sub-camera 11b. The main camera 11a and the sub-camera 11b are disposed in the compartment of the vehicle at horizontally symmetrical positions along the width of the vehicle, for example, so as to face ahead of the vehicle. The main camera 11a and the sub-camera 11b are each constituted by an imaging optical system, an imaging element, such as a CMOS image sensor, and a processing circuit that processes signals, such as imaging signals, for example. The detailed configuration of the main camera 11a and the sub-camera 11b is not illustrated.

With the above-described configuration, by using the main camera 11a and the sub-camera 11b, the stereo camera 11 images the surrounding environment in a predetermined range in front of the vehicle at preset synchronizing imaging intervals so as to obtain two pieces of image data captured from two different viewpoints. The stereo camera 11 then generates stereo image data based on the two pieces of image data. The stereo image data corresponds to surrounding environment information representing the surrounding environment during the driving of the vehicle. The surrounding environment information (image data) generated by the stereo camera 11 is output to the image processing unit 12.

The image processing unit 12 is a component unit or a circuit unit that performs predetermined image processing on the surrounding environment information (image data representing the environment during the driving of the vehicle) generated by the stereo camera 11. For example, the image processing unit 12 executes processing to detect edges of various objects, such as solid objects and marking lines, included in the image.

The image processing unit 12 also obtains distance information in accordance with the positional disparity of the corresponding edges between the left and right images based on the stereo image data and generates image information including this distance information (hereinafter called distance image information). Information, such as the distance image information, generated by the image processing unit 12 is output to the image recognition unit 13.

Based on the information, such as the distance image information, received from the image processing unit 12, the image recognition unit 13 calculates the curvatures [1/m] of left and right marking lines of a traveling route of the vehicle and also calculates the width (lane width) between the left and right marking lines. Various known methods can be used to calculate the curvatures and the lane width.

The image recognition unit 13 also performs predetermined pattern matching, for example, based on the distance image information generated by the image processing unit 12. The image recognition unit 13 then recognizes objects along the road (guardrails, curbs, and other vehicles around the vehicle, for example), parking space lines defined by marking lines in a facility, such as a parking lot, solid objects, such as parking blocks that define individual parking spaces, and a gap between the vehicle and an adjacent vehicle. The image recognition unit 13 also recognizes the condition of the road surface or the ground surface around the vehicle (hereinafter called the wheel contact surface). Hereinafter, the condition of the wheel contact surface may be called the road surface condition.

For each object, the image recognition unit 13 recognizes the type of object, height of the object, width of the object, distance from the vehicle to the object, velocity of the object, and relative velocity of the object to the vehicle, for example. The image recognition unit 13 also recognizes the relative distance between objects, such as the lateral distance between a curb at the edge of the road and a marking line nearby.

As the road surface condition, the image recognition unit 13 identifies whether the road is a paved road, an unpaved road, or a land which is not subjected to land leveling (hereinafter called an unleveled land). If the image recognition unit 13 identifies that the road is an unpaved road or an unleveled land, it recognizes details of the condition of the unpaved road or the unleveled land, such as whether it is muddy, sandy, or snowy, or whether it is flooded (in an underpass, for example), or whether it has a puddle, mud, or snow, for example (hereinafter may simply be called a puddle, for example).

It can be said that an area including a puddle, mud, or snow in an unpaved road or an unleveled land is an area where a vehicle is likely to be stuck. In the following description, such an area will be called an area where a vehicle is likely to be stuck. These road surface conditions can be estimated based on the luminance difference in the image, for example.

The above-described various items of information recognized by the image recognition unit 13 are output to the control unit 14 as the surrounding environment information. In an embodiment, the camera unit 10 including the image recognition unit 13 may serve as a "surrounding environment recognition device" that recognizes the surrounding environment of a vehicle.

The control unit 14 included in the camera unit 10 is a component unit or a circuit unit that controls the camera unit 10 and that also centrally controls the driving control apparatus 1 of the embodiment.

Various control units, such as a cockpit control unit (CP_ECU) 21, a drive motor control unit (D/M_ECU) 22, and a brake control unit (BK_ECU) 23, are coupled to the control unit 14 via an in-vehicle communication network, such as a controller area network (CAN) 40.

A human machine interface (represented as HMI in FIG. 1) 31 disposed near a driver's seat is coupled to the CP_ECU 21. The HMI 31 includes various operation members (not illustrated), various sensing devices (not illustrated), and various notifying devices 31a, for example.

Examples of various operation members are operation switches for providing an instruction to execute or stop various drive assist control operations and a mode change-over switch for switching the driving mode.

Examples of various sensing devices are a steering touch sensor that detects the steering state of a human driver, a driver monitoring system (DMS) that recognizes the face of a human driver and detects his/her eye direction, for example, and an in-vehicle monitor system constituted by an in-vehicle camera, for example, that recognizes the states of occupants including a human driver in the vehicle.

Examples of various notifying devices 31a are a touch-screen display (visual display device), a sound generating device (audio display device) including a speaker, and a combination meter integrating various instruments.

The CP_ECU 21 is a component unit or a circuit unit that executes the following operation. In response to a control signal from the control unit 14, the CP_ECU 21 suitably supplies various items of information (such as information on various alarms, the execution status of drive assist control, and the surrounding environment of the vehicle) to the human driver in a predetermine mode, such as a visual or audio display mode, by using the notifying devices 31a of the HMI 31.

The CP_ECU 21 also outputs various items of input information indicated by instruction signals input by the human driver using various operation members included in the HMI 31 to the control unit 14. An example of the instruction signals is an instruction to turn ON or OFF various drive assist control operations.

Drive motors 32F and 32R, which are drive sources of the vehicle, for example, are coupled to the output side of the D/M_ECU 22. Various sensors (not illustrated), such as an accelerator sensor, are coupled to the input side of the D/M_ECU 22.

As the drive motors, a front drive motor 32F and a rear drive motor 32R are provided. The front drive motor 32F is a drive source that drives the front wheels via a front axle. The rear drive motor 32R is a drive source that drives the rear wheels via a rear axle.

The D/M_ECU 22 is a component unit or a circuit unit that performs drive control of the front drive motor 32F and the rear drive motor 32R based on a control signal output from the control unit 14 or detection signals output from various sensors. The D/M_ECU 22 also outputs signals, such as an accelerator position signal, output from various sensors to the control unit 14.

In one embodiment, the D/M_ECU 22, the drive motors (32F and 32R), and the above-described various sensors (accelerator sensor, for example) may serve as a "drive force control device". The drive force control device performs drive control of the front wheels and the rear wheels individually.

A brake actuator 33 (represented as "BK_AC" in FIG. 1) is coupled to the output side of the BK_ECU 23. The brake actuator 33 adjusts the pressure of a brake fluid to be output to a piston in a brake wheel cylinder (not illustrated) or a piston in a brake caliper (not illustrated) included in each of the brakes provided in the corresponding front and rear wheels. Various sensors (not illustrated), such as a brake pedal sensor, a yaw rate sensor, a longitudinal acceleration sensor, and a vehicle velocity sensor, are coupled to the input side of the BK_ECU 23.

The BK_ECU 23 is a component unit or a circuit unit that controls the driving of the brake actuator 33, based on a control signal output from the control unit 14 or detection signals output from various sensors, so as to perform brake control of the vehicle. The BK_ECU 23 causes the brake actuator 33 to suitably generate a braking force in each of the wheels to perform a control operation, such as forced brake control or yaw rate control, for the vehicle. The BK_ECU 23 outputs signals indicating the brake operation state, yaw rate, longitudinal acceleration, and velocity of the vehicle, for example, output from various sensors to the control unit 14. In one embodiment, the BK_ECU 23, the brake actuator 33, and the above-described various sensors (brake pedal sensor, for example) may serve as a "brake control device".

Sensors 18, a wheel speed sensor 19, and an inclination angle sensor 20, for example, are coupled to the control unit 14. Examples of the sensors 18 are a locator unit, an in-vehicle radar, a backward image sensor, a light detection and ranging (LiDAR) device, a near infrared sensor, and an output temperature sensor, none of which are illustrated.

The wheel speed sensor 19 is a wheel speed detection sensor that detects a pulse signal (wheel speed pulse) generated in proportion to the revolutions per minute (RPM) of each of the wheels of the vehicle so as to determine the rotational speed of each of the wheels. The velocity of the vehicle can be calculated based on the wheel speed of each wheel obtained by the wheel speed sensor 19.

The inclination angle sensor 20 is a gradient detection sensor that detects the inclination of the vehicle in the longitudinal direction with respect to the horizontal level so as to detect the gradient of the wheel contact surface on the road (ground surface). The gradient of the wheel contact surface will be called the gradient of the road surface.

The control unit 14 executes driving control for the vehicle based on various items of information obtained by the camera unit 10, sensors 18, wheel speed sensor 19, and inclination angle sensor 20, for example. Driving control to be executed by the control unit 14 is driving control operations which are suitably performed for the vehicle and at least includes an output control operation performed by the D/M_ECU 22 for the drive motors 32F and 32R, a control operation performed by the D/M_ECU 22 for the torque split ratio between the driving wheels, and a brake control operation performed by the BK_ECU 23 for each of the wheels.

The control unit 14 also contains other components, such as a rough road area entry determiner 15, a road surface μ estimator 16, a brake operation detector 17.

The rough road area entry determiner 15 is a component unit or a circuit unit that determines whether the vehicle has entered a rough road area, based on various items of information obtained by the camera unit 10, sensors 18, and wheel speed sensor 19, for example.

In one example, the rough road area entry determiner 15 determines whether the vehicle has entered a rough road area by detecting the spinning state or a change in deceleration of the front wheels or the rear wheels, from the values of the rotation angles of the drive motors 32F and 32R, which are obtained in response to a drive control signal output from the D/M_ECU 22 to the drive motors 32F and 32R, or from the value of the speed of the front wheels or the rear wheels detected by the corresponding wheel speed sensor 19.

In another example, the rough road area entry determiner 15 identifies whether the road is a paved road, an unpaved road, or an unleveled land, based on the luminance difference of the wheel contact surface obtained from image data captured by the stereo camera 11, for example, and then makes a determination regarding the entry of the vehicle into a rough road area.

If the rough road area entry determiner 15 identifies that the road is an unpaved road or an unleveled land, it may determine details of the condition of the unpaved road or the unleveled land, such as the type of road surface regarding whether it is muddy, sandy, or snowy.

The rough road area entry determiner 15 may also determine whether the road is flooded (in an underpass, for example) or whether the road has an area where the vehicle is likely to be stuck in an unpaved road or an unleveled land, by considering the condition of the road that the vehicle has driven.

The road surface μ estimator 16 is a component unit or a circuit unit that estimates the friction coefficient of the wheel contact surface (hereinafter called the road surface μ), based on various items of information obtained by the camera unit 10, sensors 18, and wheel speed sensor 19, for example.

In one example, the road surface μ estimator 16 estimates the road surface μ by detecting the spinning state of the front wheels or the rear wheels, from the values of the rotation angles of the drive motors 32F and 32R, which are obtained in response to a drive control signal output from the D/M_ECU 22 to the drive motors 32F and 32R, or from the value of the speed of the front wheels or the rear wheels detected by the corresponding wheel speed sensor 19.

To estimate the road surface μ, the road surface u estimator 16 may also refer to information on the road surface condition, for example, recognized by the image recognition unit 13 and the values detected by sensors, such as the near infrared sensor and the outside temperature sensor, included in the sensors 18.

The road surface μ estimator 16 may identify whether the road is a paved road, an unpaved road, or an unleveled land, based on the luminance difference of the wheel contact surface obtained by image data captured by the stereo camera 11, for example, and may use the identification result as secondary information to estimate the road surface μ.

In this case, if the road surface μ estimator 16 identifies that the road is an unpaved road or an unleveled land, it may also determine details of the condition of the unpaved road or the unleveled land, such as whether it is muddy, sandy, or snowy, and may use the determination result as secondary information to estimate the road surface μ.

The road surface μ estimator 16 may also determine whether the road is flooded (in an underpass, for example) or whether the road has an area where the vehicle is likely to be stuck in an unpaved road or an unleveled land, and may use the determination result as secondary information to estimate the road surface μ.

The road surface μ estimator 16 may use the outside temperature as secondary information to estimate the road surface μ. In this case, if the outside temperature is higher than or equal to a predetermined threshold, the road surface μ estimator 16 may determine that the road surface u is high. If the outside temperature is lower than the predetermined threshold, the road surface μ estimator 16 may determine that the road surface μ is low.

The brake operation detector 17 is a component unit or a circuit unit that detects whether a brake operation is performed by the driver stepping on the brake pedal, for example. The brake operation detector 17 detects the execution of a brake operation by receiving a predetermined output signal from the brake control device, that is, an output signal from the brake pedal sensor transferred via the BK_ECU 23.

All or some of the components, such as the image recognition unit 13, control unit 14, rough road area entry determiner 15, road surface μ estimator 16, brake operation detector 17, CP_ECU 21, D/M_ECU 22, and BK_ECU 23, are constituted by a processor including hardware.

The processor is configured as in a known processor and includes peripheral devices. For example, as in a known processor, the processor includes a central processing unit (CPU), a random access memory (RAM), a read only memory (ROM), a non-volatile memory, and a non-volatile storage, as well as a non-transitory computer readable medium.

Software programs to be executed by the CPU and fixed data, such as data tables, are prestored in the ROM, non-volatile memory, and non-volatile storage. The CPU reads a software program stored in the ROM, for example, loads it into the RAM, and executes it, and the software program suitably refers to various items of data. As a result, the individual functions of the above-described components and units (image recognition unit 13, control unit 14, rough road area entry determiner 15, road surface μ estimator 16, brake operation detector 17, CP_ECU 21, D/M_ECU 22, and BK_ECU 23) are implemented.

The processor may be constituted by a semiconductor chip, such as a field programmable gate array (FPGA). Each of the above-described components and units (image recognition unit 13, control unit 14, rough road area entry determiner 15, road surface μ estimator 16, brake operation detector 17, CP_ECU 21, D/M_ECU 22, and BK_ECU 23) may be constituted by an electronic circuit.

The entirety or part of the software programs may be recorded, as a computer program product, in a portable disc medium, such as a flexible disk, a compact disc-read only memory (CD-ROM), and a digital versatile disc-read only memory (DVD-ROM), or in a non-transitory computer readable medium, such as a card memory, a hard disk drive (HDD), and a SSD (solid state drive).

Typically, for vehicles, such as automobiles, an upper limit value for the depth level that allows a vehicle to drive safely and reliably without being caught in water even when the vehicle enters an area with a puddle, for example, is set for each vehicle. Hereinafter, such an upper limit value will be called a depth limit value. This depth limit value is checked, not only when a vehicle enters an area with a puddle, for example, but also when a vehicle enters an area with mud or snow, for example, as a limit value for the depth level that can positively transmit a drive force of the driving wheels to the road surface.

In one example, if a vehicle enters a puddle, for example, and is caught in water beyond a predetermined depth limit value, electrical components of the vehicle, for example, may be under water and the vehicle may become unable to drive.

In another example, if a vehicle enters an area where it is likely to be stuck, such as in a muddy or snowy area, beyond the predetermined depth limit value, the bottom surface of the floor board of the vehicle may touch the ground surface, such as the top surface of the muddy or snowy area. In this case, the vehicle is unable to firmly contact the wheel contact surface, or even if the wheels touch the ground surface, the driving wheels may spin out due to a low road surface μ, that is, the vehicle may become stuck.

Figure 2:
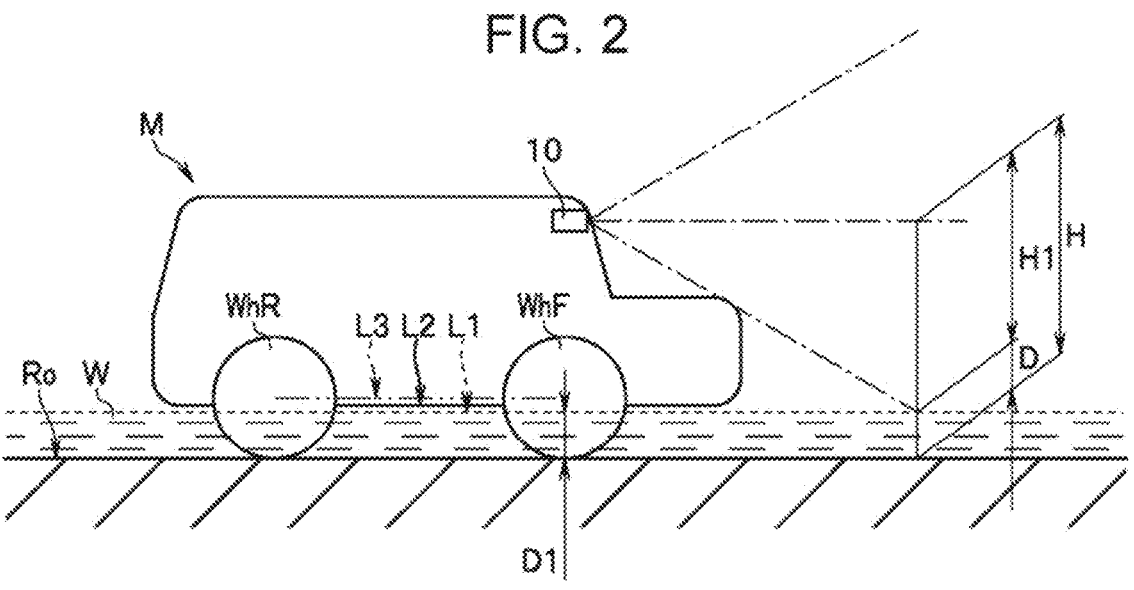
FIG. 2 is a schematic view for explaining a depth limit value of a vehicle driving on a flooded flat road.

The depth limit value of a vehicle will be explained below with reference to FIG. 2. FIG. 2 is a schematic view for explaining the depth limit value of a vehicle driving on a flooded flat road.

As the depth limit value determined for a regular vehicle, the following standard is adopted, for example.

FIG. 2 illustrates a situation where a vehicle M is at a standstill or drives on a flat road surface Ro. The road surface Ro is covered with flooded water W. The depth of the flooded water W is a depth D.

In the example in FIG. 2, the depth D of the flooded water W reaches a predetermined depth limit value D1. Hereinafter, an explanation will be given, assuming that the depth D is equal to the predetermined depth limit value D1 of the vehicle M.

In FIG. 2, a front wheel WhF and a rear wheel WhR of the vehicle M are illustrated. The vehicle M includes the camera unit 10. The camera unit 10 is fixed to the top center of the front side of the compartment of the vehicle M.

In FIG. 2, L1 indicates the surface of the flooded water W; L2 indicates the bottom surface of the floor board of the vehicle M; and L3 indicates a virtual straight line which links the rotation center of the front wheel WhF and that of the rear wheel WhR.

Desirably, the depth limit value D1 determined for the vehicle M in FIG. 2 is set to be smaller than or equal to the radius of the front wheels WhF and the rear wheels WhR (L3≥D1) or to be smaller than or equal to the bottom surface L2 of the floor board of the vehicle M (L2≥D1), in other words, the bottom surface L2 does not contact the surface L1 of the flooded water W (or the surface of mud or snow, for example).

In the situation illustrated in FIG. 2, that is, the situation where the vehicle M is on the flat road surface Ro, the camera unit 10 can determine the depth D of the flooded water W based on the obtained image data.

To determine the depth D of the flooded water W, the camera unit 10 first detects the distance from its installation position to the surface L1 of the flooded water W (see a height H1 in FIG. 2). The height H in FIG. 2 is the height of the installation position of the camera unit 10. That is, the height H is the length of a straight line which extends from the installation position of the camera unit 10 to the road surface Ro in the vertical direction and which intersects with the road surface Ro. The height H of the installation position of a camera unit is a predetermined value set for an individual vehicle.

The depth D of the flooded water W in the situation in FIG. 2 (where the vehicle M is on the flat level) can be determined from the height H1 detected based on the image data obtained by the camera unit 10 and the preset height H from the installation position of the camera unit 10 to the road surface Ro (D=H−H1).

In the situation in FIG. 2 (where the vehicle M is on the flat level), the vehicle M drives while detecting the depth D of the flooded water W with the camera unit 10 and, when the depth of the vehicle M is likely to exceed the predetermined depth limit value D1, the driving control apparatus 1 executes driving control for the vehicle M by suitably performing brake control or drive force control so that the vehicle M can avoid being caught in water or being stuck.

The predetermined depth limit value D1 of the vehicle M is set to, for example, the length from the contact surface of the front wheel WhF on the road surface Ro to the surface L1 of the flooded water W on a straight line which passes through the rotation center of the front wheel WhF.

Figure 3:
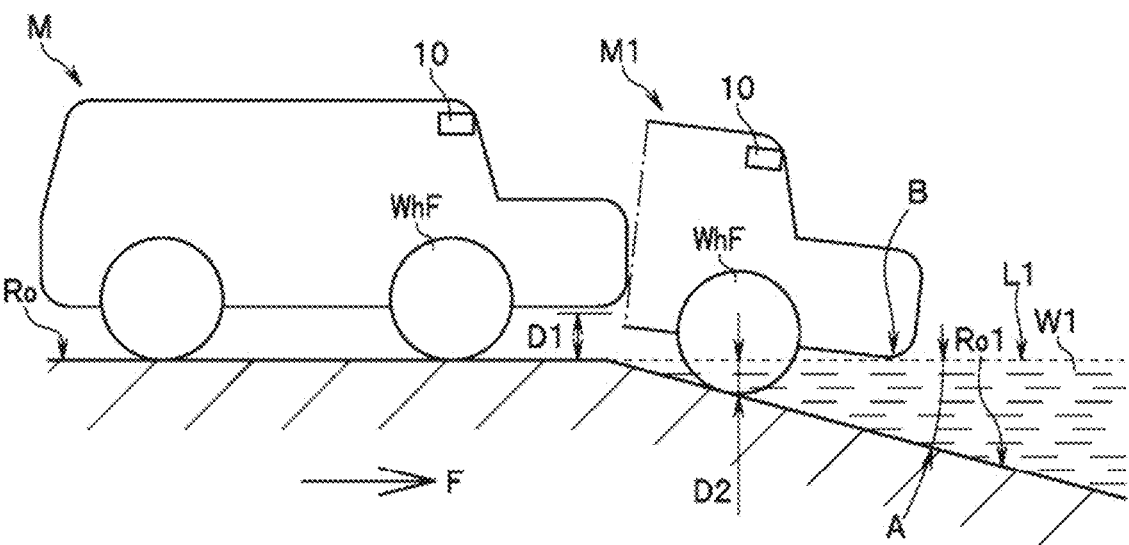
FIG. 3 illustrates a situation where a vehicle is entering an area where it is likely to be stuck while driving on a flat road.
Figure 4:
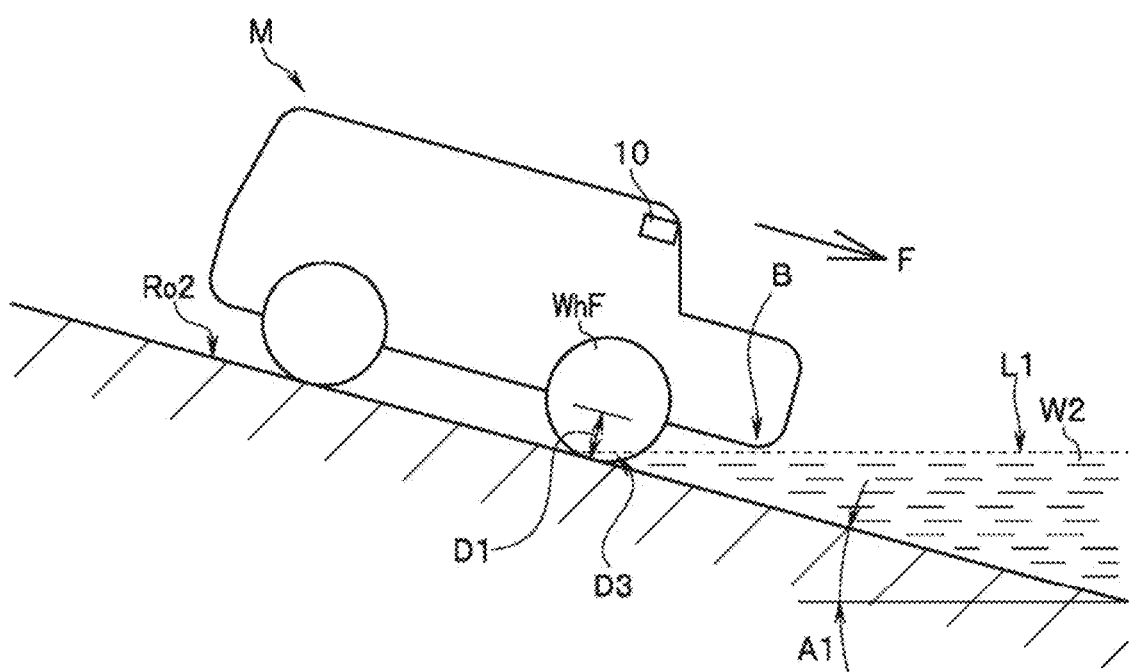
FIG. 4 illustrates a situation where a vehicle is driving on a road having a gradient and is entering a flooded area.

In a situation where the vehicle M is entering an area where it is likely to be stuck, such as in a puddle, while driving on a flat road (see FIG. 3) or a situation where the vehicle M driving on a road having a gradient (see FIG. 4) is entering a flooded area, it is not possible to use the depth limit value D1 determined for the situation in FIG. 2 (where the vehicle M is on the flat level) as the depth limit value for the situation in FIG. 3 or 4.

In one example, a situation where the vehicle M is entering a puddle W1 on a road having a gradient A while driving on a flat road, as illustrated in FIG. 3, will be considered. In FIG. 3, the vehicle M is driving on the flat road surface Ro in a traveling direction F. In FIG. 3, D1 indicates the depth limit value of the vehicle M on a flat level.

FIG. 3 also illustrates part of a vehicle M1, which is the vehicle M having driven on the flat road surface Ro in the traveling direction F, whose front wheel WhF has entered the puddle W1. Only the front part of the vehicle M1 is illustrated and the rear part is omitted. Ro indicates the flat road surface, while Ro1 indicates the road surface having the gradient A covered with the puddle W1.

In this situation, the front wheel WhF of the vehicle M1 has advanced to a position having a depth D2, as illustrated in FIG. 3. The depth D2 is smaller than the depth limit value D1 determined for the vehicle M on the flat level (D1>D2). At this point (at the position of the vehicle M1), however, the frontmost portion B of the vehicle M1 is on the verge of being under water. It can thus be said that the depth D2 is the depth limit value of the vehicle M1 in this situation (hereinafter called the depth limit value D2).

As described above, the depth limit value D2 of the vehicle M1 which is entering the puddle W1 on the road having the gradient A is smaller than the depth limit value D1 of the vehicle M on the flat level (D1>D2).

In another example, a situation where the vehicle M driving on a road having a gradient A1 is entering the flooded area W2 as illustrated in FIG. 4 is considered. In FIG. 4, the vehicle M is driving on a road surface Ro2 having the gradient A1. In FIG. 4, D1 is the depth limit value of the vehicle M on the flat level. In FIG. 4, a situation where the vehicle M is entering the flooded area W2 in an underpass from the paved road (road surface Ro2) is assumed.

In this situation, the front wheel WhF of the vehicle M has advanced to a position having a depth D3, as illustrated in FIG. 4. The depth D3 is smaller than the depth limit value D1 determined for the vehicle M on the flat level (D1>D3). At this point (at the position having the depth D3 at which the front wheel WhF has advanced), however, the frontmost portion B of the vehicle M is on the verge of being under water. It can thus be said that the depth D3 is the depth limit value of the vehicle M in this situation (hereinafter called the depth limit value D3).

As described above, the depth limit value D3 of the vehicle M which is driving on the road surface Ro2 having the gradient A1 and entering the flooded area W2 is smaller than the depth limit value D1 of the vehicle M on the flat level (D1>D3).

To determine the depth limit value in a situation where the vehicle M is entering an area where it is likely to be stuck, such as in a puddle (see FIG. 3), or in a situation where the vehicle M is entering a flooded area from a road having a gradient (see FIG. 4), a certain correction is to be made to the depth limit value determined for a situation where the vehicle M is driving on a flat level (see FIG. 2). A certain correction to be made to the depth limit value can be determined in advance in accordance with the driving situation of the vehicle and the gradient of the road surface.

It is convenient if a correction map regarding the depth limit value is prepared in accordance with the driving situation of a vehicle, such as:

(1) situation where a vehicle is driving on a flat road surface (situation in FIG. 2);

(2) situation where a vehicle is entering an area where it is likely to be stuck while driving on a flat road (situation in FIGS. 3); and (3) situation where a vehicle is driving on a road surface having a gradient and is entering a flooded area (situation in FIG. 4).

Then, a corrected value is set for each situation in accordance with the gradient of the road surface.

Figure 5:
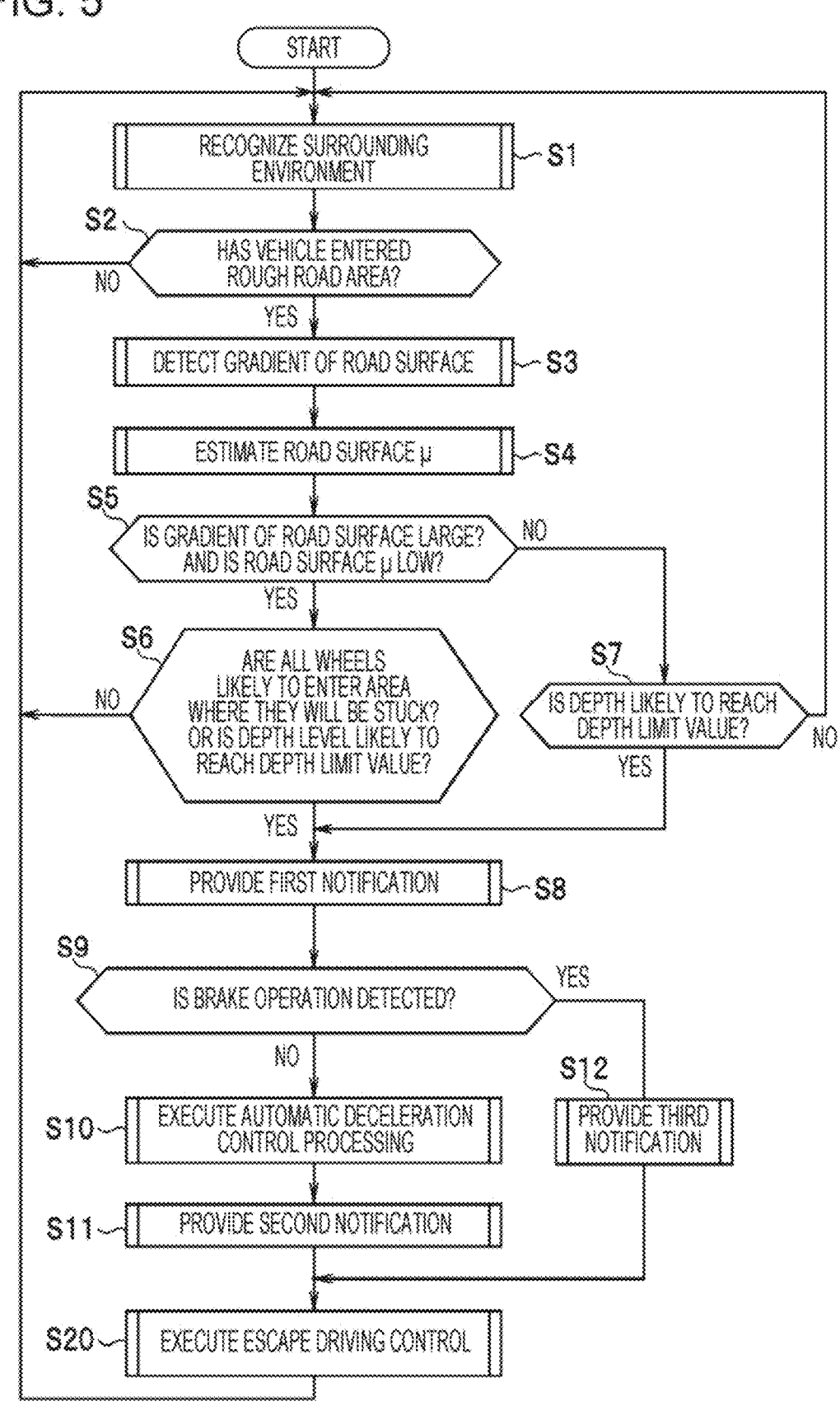
FIG. 5 is a flowchart illustrating an operation of a driving control apparatus of an embodiment of the disclosure, for example, driving control performed by the driving control apparatus while a vehicle is driving in a rough road area.

An operation of the driving control apparatus 1 according to an embodiment of the disclosure, for example, driving control performed by the driving control apparatus 1 while the vehicle M is driving in a rough road area, will be discussed below with reference to FIG. 5. FIG. 5 is a flowchart illustrating an operation of the driving control apparatus 1 of an embodiment of the disclosure, for example, driving control performed by the driving control apparatus 1 while a vehicle is driving in a rough road area.

It is assumed that the vehicle M loading the driving control apparatus 1 of the embodiment is driving on a road or others toward the front direction. The road or others includes ordinary roads, such as public roads and private roads, as well as areas other than the ordinary roads, such as public and private premises (camp sites and river beds, for example). When the vehicle M is driving, the driving control apparatus 1 of the embodiment loaded in the vehicle M is in the active state.

While the vehicle M is in the above-described state, in step S1 in FIG. 5, the control unit 14 executes surrounding environment recognition processing to recognize the surrounding environment of the vehicle M and the state of the vehicle M, based on output data from the camera unit 10, sensors 18, wheel speed sensor 19, and inclination angle sensor 20, for example. The control unit 14 continuously executes this surrounding environment recognition processing while the driving control apparatus 1 is in the active state.

In step S2, the rough road area entry determiner 15 of the control unit 14 determines whether the vehicle M has entered a rough road area, based on information obtained in step S1.

The rough road area is an area other than a paved road, such as in an unpaved road or an unleveled land, and is an area where the vehicle M is likely to be stuck.

The rough road area entry determiner 15 makes the above-described determination in step S2 in the following manner, for example. The rough road area entry determiner 15 detects the luminance difference of the wheel contact surface around the vehicle M, for example, based on image data obtained by the stereo camera 11 of the camera unit 10 and makes the above-described determination based on the detection result. In another example, the rough road area entry determiner 15 detects a change in the wheel speed of each wheel, for example, based on wheel speed data of the four wheels of the vehicle M obtained by the wheel speed sensor 19, and makes the above-described determination based on the detection result.

If it is determined in step S2 that the vehicle M has entered a rough road area, the control unit 14 proceeds to step S3. If it is not found in step S2 that the vehicle M has entered a rough road area, the control unit 14 returns to step S1 and repeats steps S1 and S2.

In step S3, the control unit 14 receives output data from the inclination angle sensor 20 and detects the gradient of the road surface.

Then, in step S4, the road surface μ estimator 16 of the control unit 14 estimates the road surface μ of the wheel contact surface around the vehicle M, based on output data from the camera unit 10, sensors 18, and wheel speed sensor 19, for example.

In step S5, the control unit 14 refers to information on the gradient of the road surface detected in step S3 and information on the road surface μ estimated in step S4, and determines whether the gradient of the road surface is greater than a predetermined threshold and whether the estimated road surface μ is smaller than a predetermined threshold. If the gradient of the road surface is greater than the predetermined threshold and if the estimated road surface μ is smaller than the predetermined threshold, the control unit 14 proceeds to step S6. If the result of step S5 does not satisfy the above-described two conditions, the control unit 14 proceeds to step S7.

In step S6, the rough road area entry determiner 15 determines whether all the wheels are likely to enter an area where they will be stuck or whether the depth level is likely to reach the depth limit value, based on output data from the camera unit 10, sensors 18, and wheel speed sensor 19, for example. If all the wheels are likely to enter an area where they will be stuck or if the depth level is likely to reach the depth limit value, the control unit 14 proceeds to step S8. If the vehicle M is neither in the above-described two states, the control unit 14 returns to step S1 and repeats the above-described steps.

In step S7, the rough road area entry determiner 15 determines whether the depth level is likely to reach the depth limit value, based on output data from the camera unit 10, sensors 18, and wheel speed sensor 19, for example. If the depth level is likely to reach the depth limit value, the control unit 14 proceeds to step S8. If the depth level is not likely to reach the depth limit value, the control unit 14 returns to step S1 and repeats the above-described steps.

In step S8, the control unit 14 executes first notification processing using the notifying devices 31a. The content of the notification in the first notification processing is an alarm notification, such as "If you go further, your vehicle may be stuck".

Then, in step S9, the brake operation detector 17 of the control unit 14 determines whether the driver who is driving the vehicle M has performed a brake operation. The brake operation detector 17 can make this determination by checking whether an output signal from a brake pedal sensor, which is not illustrated, is detected.

If a brake operation performed by the driver is not detected in step S9, the control unit 14 proceeds to step S10. If a brake operation performed by the driver is detected in step S9, the control unit 14 proceeds to step S12.

In step S10, the control unit 14 executes predetermined automatic deceleration control processing by controlling the brake actuator 33 via the BK_ECU 23. The automatic deceleration control processing is brake control processing performed by the brake control device (BK_ECU 23, for example) and is first avoidance control for causing the vehicle M to avoid entering an area where the vehicle M is likely to be stuck in the rough road area.

Then, in step S11, the control unit 14 executes second notification processing by using the notifying devices 31a.

The content of the notification in the second notification processing is an alarm notification, such as "Your vehicle will stop automatically and then move backward. Please do not put your foot on the brake pedal". The control unit 14 then proceeds to step S20.

If a brake operation performed by the driver is detected in step S9, the control unit 14 proceeds to step S12. In step S12, the control unit 14 executes third notification processing by using the notifying devices 31*a*. The content of the notification in the third notification processing is an alarm notification, such as "Your vehicle will move backward. Please remove your foot off the brake pedal". The control unit 14 then proceeds to step S20.

In step S20, the control unit 14 executes predetermined escape driving control processing. This escape driving control processing is drive control processing performed by the drive force control device (D/M_ECU 22, for example) and second avoidance control for causing the vehicle M to avoid entering an area where the vehicle M is likely to be stuck in the rough road area and to get out of this area.

Figure 6:
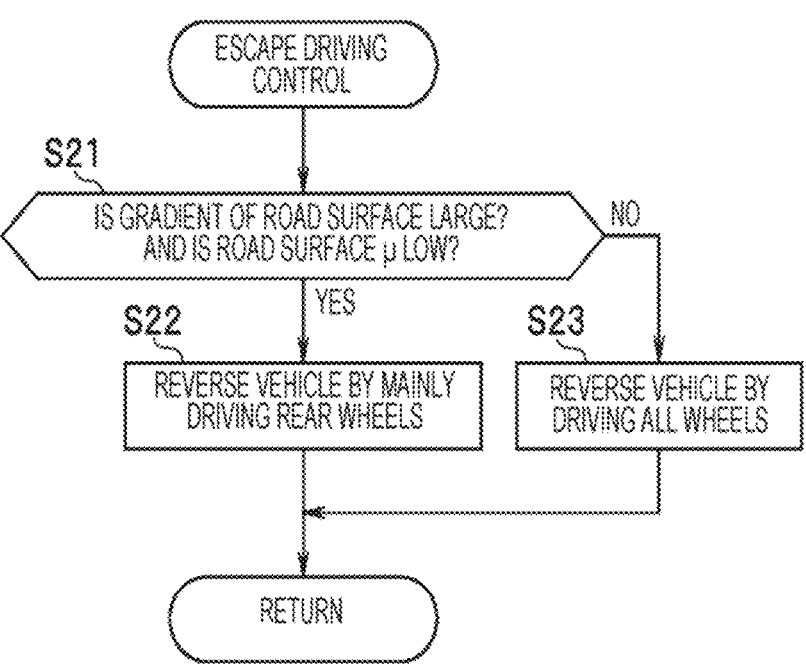
FIG. 6 is a flowchart illustrating a subroutine of escape driving control processing in step S20 in FIG. 5.

FIG. 6 is a flowchart illustrating a subroutine of escape driving control processing.

In step S21 of FIG. 6, the rough road area entry determiner 15 of the control unit 14 refers to the information on the gradient of the road surface detected in step S3 and the information on the road surface μ estimated in step S4, and determines whether the gradient of the road surface is greater than a predetermined threshold and whether the estimated road surface μ is smaller than a predetermined threshold. If the gradient of the road surface is greater than the predetermined threshold and if the estimated road surface μ is smaller than the predetermined threshold, the control unit 14 proceeds to step S22. If the result of step S110 does not satisfy the above-described two conditions, the control unit 14 proceeds to step S23.

In step S22, the control unit 14 controls the drive motors 32F and 32R via the D/M_ECU 22 to execute reverse driving control by splitting a drive force unevenly to the front wheels and the rear wheels to mainly drive the rear wheels and to regulate the application of the drive force to the front wheels.

The situation at this stage is that the gradient of the road surface is large and the estimated road surface μ is low as described above and the front wheels have entered the area where they are likely to be stuck but the rear wheels have not yet entered such an area. In this situation, a drive force is split unevenly such that it is applied mainly to the rear wheels, which may make it easy for the vehicle M to get out of the situation. In step S22, therefore, drive control is performed so as to mainly drive the rear wheels while regulating the application of a drive force to the front wheels. To allow the vehicle M to get out of the situation, reverse driving control is performed as discussed above. The control unit 14 then returns to step S1 in FIG. 5.

In step S23, the control unit 14 controls the drive motors 32F and 32R via the D/M_ECU 22 to execute reverse driving control by driving all the wheels. The control unit 14 then returns to step S1 in FIG. 5.

As described above, in the above-described embodiment, for example, when it is detected that the vehicle M is to enter an area where it is likely to be stuck, such as an area with a puddle, mud, or snow, while driving in a rough road area, the vehicle M is caused to decelerate or stop before the level of the vehicle M reaches the depth limit value. In this case, a first notification is provided with the notifying devices 31*a* to the driver who is driving the vehicle M to instruct him/her to perform a brake operation or to perform automatic brake control, thereby allowing the vehicle M to avoid entering the area where it is likely to be stuck (first avoidance control).

In this case, the timing at which first avoidance control is preformed is made different in accordance with the gradient of the road surface and the estimated road surface μ. When the gradient of the road surface is large and the estimated road surface μ is low, first avoidance control is performed before all the wheels enter the area where they are likely to be stuck. In the other cases, first avoidance control is performed before the level of the vehicle M reaches the depth limit value. This is based on the assumption that, as the gradient of the road surface is larger and the estimated road surface μ is lower, it is more difficult for the vehicle M to get out of the area. That is, escape driving control is performed at a stage before all the wheels enter the area where they are likely to be stuck.

In this manner, after deceleration control is performed to stop the vehicle M before the vehicle M enters an area where it is likely to be stuck, reverse driving control is performed to allow the vehicle M to get out of this area. When performing reverse driving control, the split ratio of a drive force to be applied to the front wheels and the rear wheels is suitably changed in accordance with the gradient of the road surface and the estimated road surface μ. The vehicle M can thus get out of the area smoothly and positively.

In one example, when the gradient of the road surface is large and the estimated road surface μ is low, reverse driving control is performed with a split ratio of a drive force to mainly drive the rear wheels and to regulate the application of the drive force to the front wheels. In the other cases, reverse driving control is performed to drive all the wheels.

As a result of executing the above-described driving control, the vehicle M can avoid being caught in water or being stuck.

The disclosure is not limited to the above-described embodiment and various modifications, variations, and applications may be made without departing from the spirit and scope of the disclosure. For example, some of the components disclosed in the embodiment may be omitted suitably, and components in different embodiments may be combined suitably. It is intended that the scope of the disclosure be restricted by the following claims and their equivalents but not by specific embodiments.

According to an embodiment of the disclosure, it is possible to provide a driving control apparatus for a vehicle, such as an automobile, which can perform driving control so as to allow the vehicle to avoid being caught in water or being stuck when driving in a rough road area, for example.

The driving control apparatus 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the image recognition unit 13, control unit 14, rough road area entry determiner 15, road surface u estimator 16, brake operation detector 17, CP_ECU 21, D/M_ECU 22, and BK_ECU 23. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM.

The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A driving control apparatus for a vehicle, the driving control apparatus comprising:
   a surrounding environment recognition device configured to obtain surrounding environment information of the vehicle;
   a brake control device configured to perform brake control for the vehicle;
   a drive force control device configured to perform drive control of front wheels and rear wheels individually;
   one or more processors; and
   one or more memories storing instructions causing the one or more processors to:
      execute a determination of entry of the vehicle into a rough road area,
      estimate a friction coefficient of a wheel contact surface of the vehicle,
      execute first avoidance control and then to execute second avoidance control when the one or more processors have determined that the vehicle is to enter an area where the vehicle is likely to be stuck in the rough road area, the first avoidance control causing the vehicle to decelerate and the second avoidance control causing the vehicle to move backward.

2. The driving control apparatus according to claim 1, wherein:
   the first avoidance control is the brake control performed by the brake control device; and
   the second avoidance control is the drive control performed by the drive force control device.

3. The driving control apparatus according to claim 1, further comprising a notifying device,
   wherein the one or more processors are further configured to:
      perform a detection of a brake operation performed by a driver who is driving the vehicle,
      provide an alarm notification using the notifying device; and
      execute the second avoidance control when the one or more processors have determined that (i) the vehicle is to enter the area where the vehicle is likely to be stuck in the rough road area, and (ii) the brake operation performed by the driver is detected.

4. The driving control apparatus according to claim 1, wherein:
   the first avoidance control is an automatic deceleration control to cause the vehicle to decelerate or stop before entering the area where the vehicle is likely to be stuck.

5. The driving control apparatus according to claim 1, wherein:
   the second avoidance control is reverse driving control to cause the vehicle to move backward away from the area where the vehicle is likely to be stuck.

6. A driving control apparatus for a vehicle, the driving control apparatus comprising circuitry configured to
   obtain surrounding environment information of the vehicle,
   perform brake control for the vehicle,
   perform drive control of front wheels and rear wheels individually,
   execute a determination of entry of the vehicle into a rough road area,
   estimate a friction coefficient of a wheel contact surface, and
   execute first avoidance control and then to execute second avoidance control when it is determined that the vehicle is to enter an area where the vehicle is likely to be stuck in the rough road area, based on a result of the determination regarding the entry of the vehicle into the rough road area, the first avoidance control causing the vehicle to decelerate and the second avoidance control causing the vehicle to move backward.

7. The driving control apparatus according to claim 6, wherein:
   the first avoidance control is the brake control performed by the circuitry; and
   the second avoidance control is the drive control performed by the circuitry.

8. The driving control apparatus according to claim 6, further comprising a notifying device,
   wherein the circuitry is further configured to:
      perform a detection of a brake operation performed by a driver who is driving the vehicle,
      provide an alarm notification using the notifying device; and
      execute the second avoidance control when it is determined that (i) the vehicle is to enter the area where the vehicle is likely to be stuck in the rough road area, and (ii) the brake operation performed by the driver is detected.

9. The driving control apparatus according to claim 6, wherein:
   the first avoidance control is an automatic deceleration control to cause the vehicle to decelerate or stop before entering the area where the vehicle is likely to be stuck.

10. The driving control apparatus according to claim 6, wherein:
   the second avoidance control is reverse driving control to cause the vehicle to move backward away from the area where the vehicle is likely to be stuck.

* * * * *